Sept. 8, 1964 H. S. WEISZ ETAL 3,147,954
APPARATUS FOR MANUFACTING EMULSIONS OF COLORING MATERIAL
Filed Feb. 1, 1961 3 Sheets-Sheet 1

INVENTORS:
HERMAN S. WEISZ and
BERNARD SCHEFFLER
BY Eaton, Bell, Hunt & Seltzer
ATTORNEYS

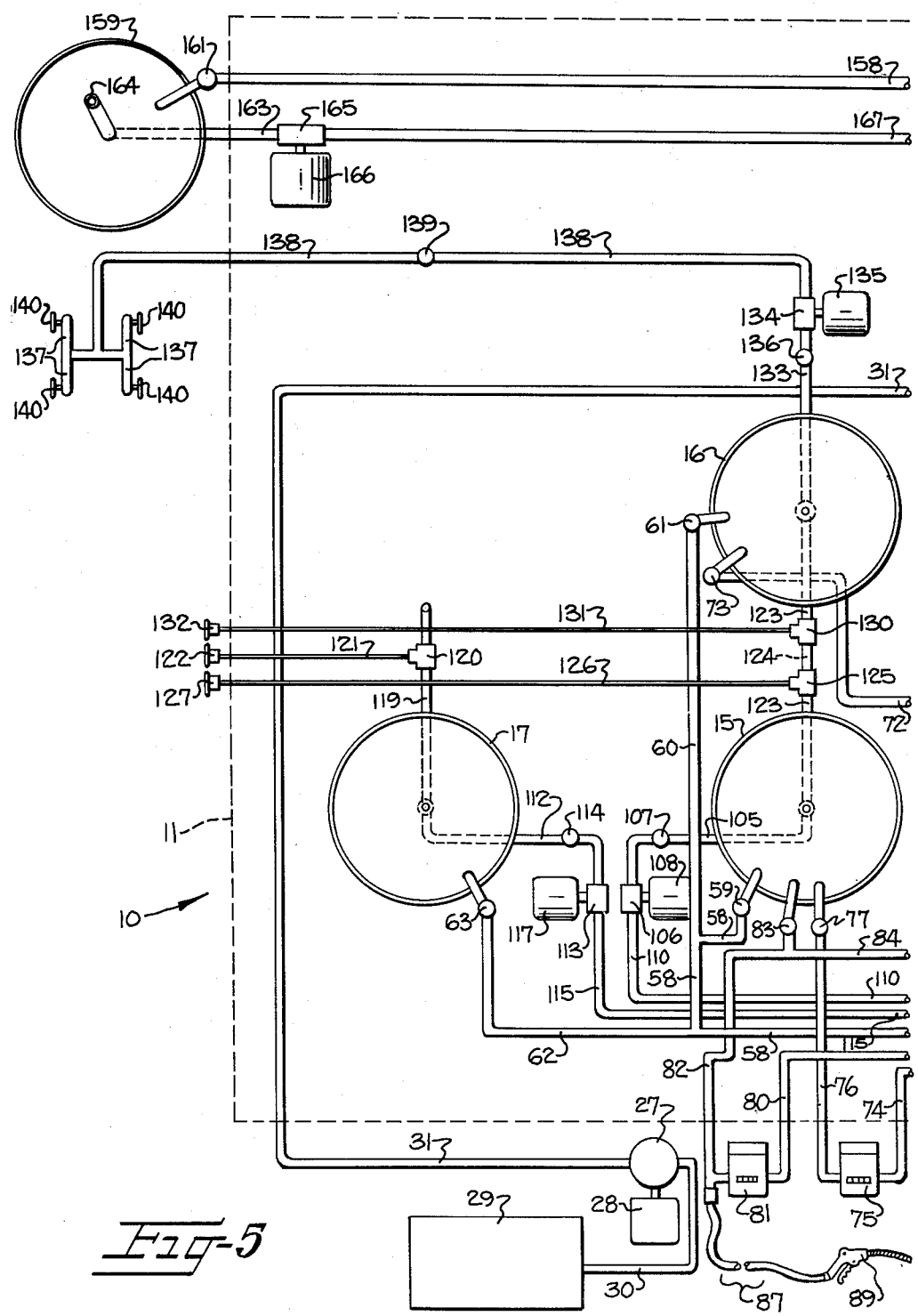

Sept. 8, 1964       H. S. WEISZ ETAL            3,147,954
         APPARATUS FOR MANUFACTING EMULSIONS OF COLORING MATERIAL
Filed Feb. 1, 1961                           3 Sheets-Sheet 3

INVENTORS
HERMAN S. WEISZ and
BERNARD SCHEFFLER

BY Eaton, Bell, Hunt & Seltzer
                    ATTORNEYS

United States Patent Office
3,147,954
Patented Sept. 8, 1964

3,147,954
APPARATUS FOR MANUFACTURING EMULSIONS OF COLORING MATERIAL
Herman S. Weisz and Bernard Scheffler, Rock Hill, S.C., assignors to Rock Hill Printing & Finishing Co., Rock Hill, S.C., a corporation of Delaware
Filed Feb. 1, 1961, Ser. No. 86,417
7 Claims. (Cl. 259—2)

The present invention relates to an improved apparatus for manufacturing emulsions of coloring material.

Color pigments for textile printing dyes and the like are usually received in the textile plant in cake form and it has heretofore been necessary to perform a grinding or crushing operation thereon to reduce the same into finely divided particles, which are readily dissolved in or mixed with a liquid to form the dye. The apparatus necessary to perform the grinding operation was expensive to purchase and to maintain. Also, the apparatus took up considerable floor space and required several employees to operate the same.

As the cakes of color pigments were being ground, predetermined quantities of liquid, solvents and resins were added thereto to form a mixture of relatively smooth consistency. The act of placing the predetermined quantities of liquid, resins and solvents in the grinding apparatus was usually done manually. The grinding apparatus has heretofore been used to mix the color pigments, liquid, resins and solvents, but the same was inefficient since it operated very slowly and required several employees to operate the same. Also, the mixture or dye formed thereby had a very short suspension life since the color pigments would settle to the bottom of the storage receptacle in a short period of time. The dye would then have to be re-mixed before the same could be used which greatly increased the cost thereof.

The grinding apparatus which has heretofore been used was not entirely successful in reducing the color pigments to the particle size necessary for successful use thereof. It is well known in the textile printing art that the color pigments must be reduced to fine particle form to prevent the color pigments from wearing grooves in the doctor blades of the printing apparatus. If such a groove is worn in the doctor blades, a strip of color will run longitudinally of the cloth between the different designs causing "seconds" or commercially useless cloth. Also, the maintenance cost of the printing apparatus was high since the doctor blades had to be frequently replaced.

The present invention was developed to obviate the aforementioned difficulties found in the prior art. The present invention provides a plurality of adjacent vats which are so positioned as to be subject to a common mixing device operable at high speeds. Predetermined quantities of liquid and solvents are added to the vats through automatic meters which may be set to allow only predetermined quantities to pass therethrough such that the manual step of measuring the quantities of liquid and solvents is omitted. Also, means is provided for metering the quantities of resins applied to the vats as desired wherein manual handling of the resin is obviated. The apparatus of the present invention is capable of receiving the color pigments in cake form without the necessity of grinding the same into fine particle form inasmuch as the common mixing device which has a mixing blade with a serrated edge is capable of agitating the cakes in the liquid to break them into small pieces which are readily dissolved or dispersed therein. Also, the common mixing device is capable of mixing the color pigments with the liquid, solvents and resins such that the dispersion created thereby has a longer life than has heretofore been possible. Further, the dispersion created by the common mixing device is passed through an ultrasonic disperser wherein the size of the particles of color pigments in the dispersion is substantially reduced to form an emulsion of the coloring material with a substantially longer life than has heretofore been possible with textile printing dye.

It is therefore an object of the present invention to provide an improved apparatus for manufacturing emulsions of coloring material wherein the particles of color pigments are of such finely divided size that they stay in suspension for a substantially longer time than has heretofore been possible giving a much longer life thereto and allowing the same to be stored for longer periods of time and do not wear any grooves in the doctor blades of the textile printing apparatus.

A more specific object of the present invention is to provide an improved apparatus for manufacturing emulsions of coloring material wherein a plurality of vats and a common mixing device therefor are provided wherein the color pigments are receivable in cake form to be dissolved or dispersed in a liquid in one of said plurality of vats and transferred to a second wherein other liquid is added as desired and the same mixed by said common mixing device to provide a dispersion of the color pigments in the liquid and the resultant dispersion is passed through an ultrasonic disperser wherein the size of the particles of color pigments is reduced to form an emulsion therefrom having a substantially longer suspension life than has heretofore been possible and which causes a reduction in the wear of the printing apparatus.

A still more specific object of the present invention is to provide an improved apparatus for manufacturing emulsions of coloring material wherein a plurality of vats and a common mixing device therefor are provided capable of receiving color pigments in cake or other forms, dissolving or dispersing the same in a liquid in one of said plurality of vats, transferring the solution or dispersion to a second vat wherein premixed resins, liquid and solvents are added as desired and the same mixed by the common mixing device to provide a dispersion of the color pigments in the liquid, solvents and resins. The dispersion is then passed through an ultrasonic disperser wherein the size of the particles of color pigments is reduced to form an emulsion thereof having a substantially longer life than previous dyes and wherein means is provided capable of recirculating the emulsion through the second vat with action by the common mixing device and the ultrasonic disperser or recirculating the same through the ultrasonic disperser alone to provide an even finer emulsion of the dispersion to further extend the life of the resultant dye and to reduce the wear on the printing apparatus.

Some of the objects of the invention having been stated, other objects will appear as the description proceeds, when taken in connection with the accompanying drawings, in which—

FIGURES 5 and 5A collectively form a plan view of the apparatus with the platform removed to show the piping arrangement and with portions of the apparatus shown schematically.

Figure 1:
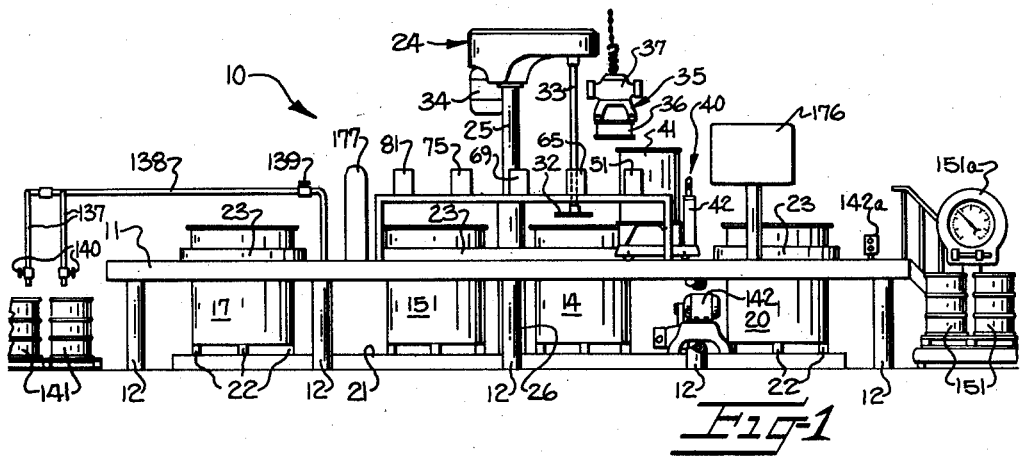
FIGURE 1 is a side elevation view of the apparatus of the present invention with portions broken away.
Figure 2:
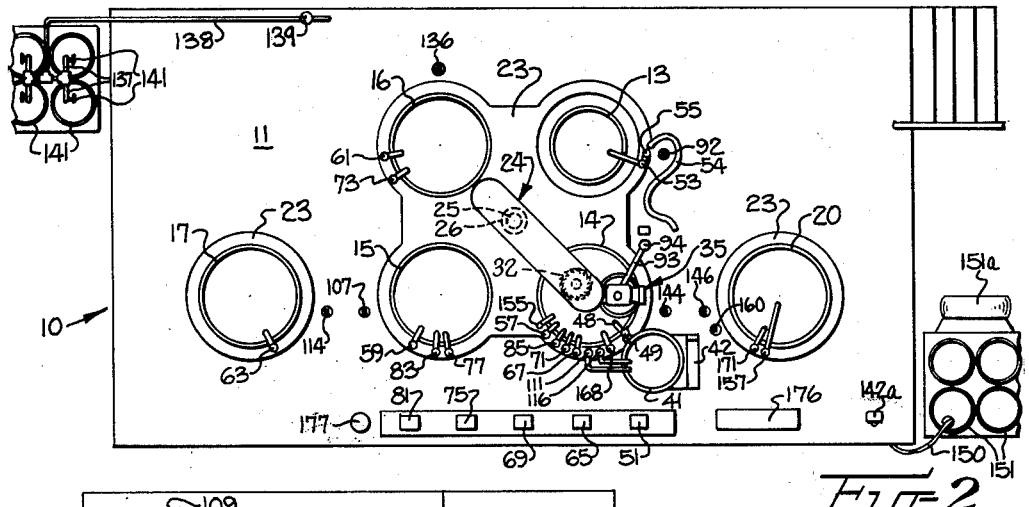
FIGURE 2 is a top plan view of the apparatus shown in FIGURE 1 with portions broken away.

Referring now to the drawings and particularly to FIGURES 1 and 2, the apparatus 10 comprises a platform 11 mounted on suitable posts 12 above a suitable supporting surface such as the floor and the like. A plurality of tanks or vats 13, 14, 15, 16, 17 and 20 are supported by suitable legs 22 on a suitable curbing 21 supported on the surface and extend upwardly through the platform 11 to a point thereabove. The platform 11 has suitable curbing 23 formed thereon around the vats 13–17 and 20 to aid in securing them in place.

Figure 5A:
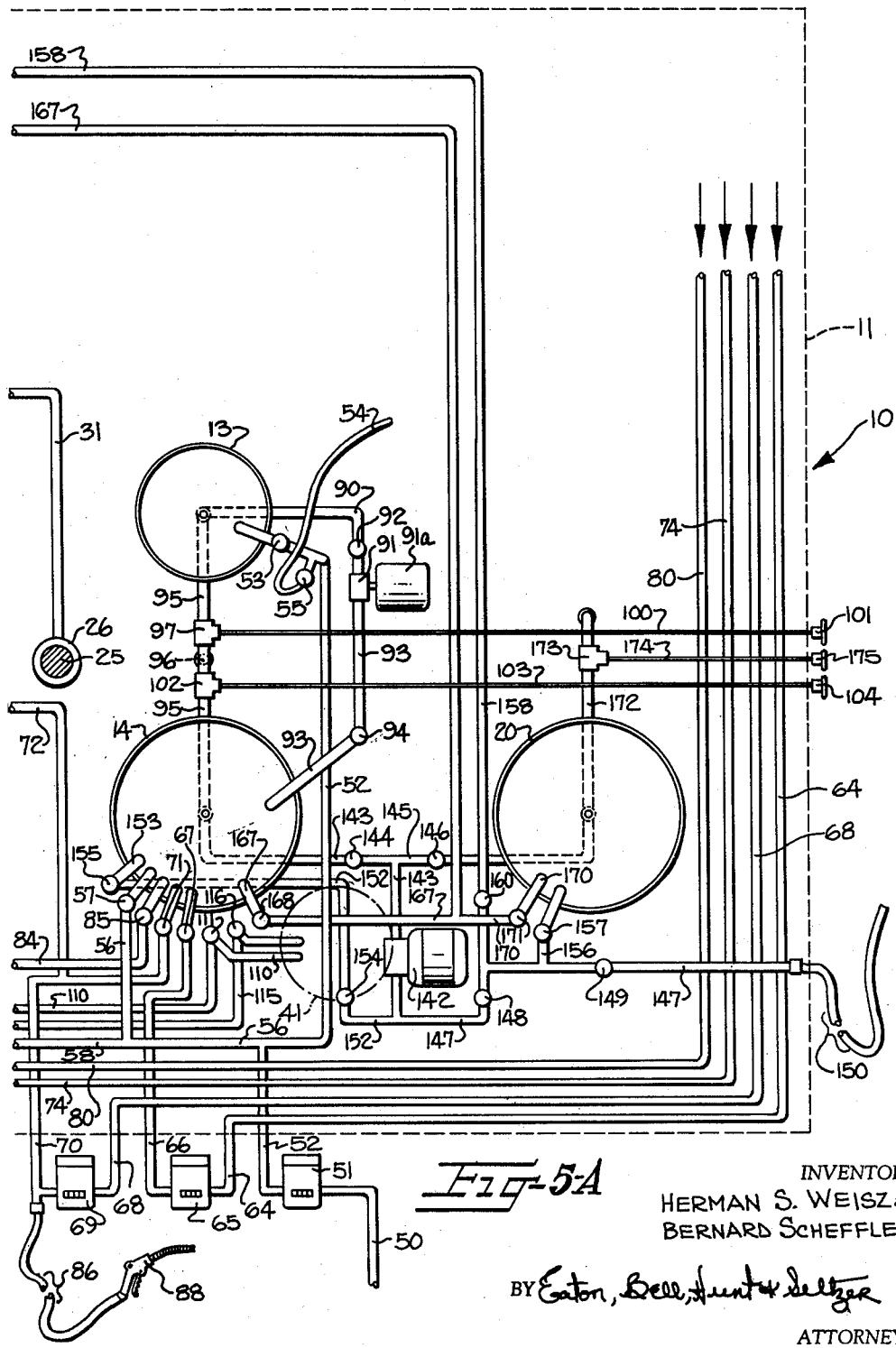

A mixing device 24 is mounted above the platform 11 by a column 25 which is telescopically and rotatably received within a column 26 supported at its lower end on curbing 21 and extending upwardly through platform 11. A suitable hydraulic lifting mechanism (FIGURE 5) comprising a reversible pump 27 and a reversible motor 28 for driving the pump to force hydraulic fluid from a suitable fluid reservoir 29, connected thereto by a pipe 30, through a pipe 31 to column 26 to raise column 25 therein. When reversed, pump 28 withdraws fluid from column 26 to lower column 25 therein. It will therefore be seen that mixing device 24 is vertically adjustable relative to the vats.

Mixing device 24 comprises a mixing rotor 32 carried by a shaft 33. Rotor 32 comprises a disc mounted for rotation with shaft 33 and having a serrated or saw-tooth peripheral edge which aids in breaking the color pigments into small particles and also agitates the contents of the vats to dissolve or disperse the color pigments in the liquid, resins and solvents or the like. Shaft 33 is driven by a suitable electric motor 34 by conventional connections (not shown). Mixing device 24 is pivotally mounted relative to platform 11 due to the column 25 being rotatively mounted in column 26 such that mixing device 24 may be moved between any of the plurality of vats 13, 14, 15 and 16 for mixing the contents thereof as desired.

A straining device 35 (FIGURE 1) is mounted over mixing vat 14 and comprises a universal screen 36 eccentrically mounted on the output shaft (not shown) of a motor 37 in depending relationship. Motor 37 is adapted to vibrate or shake the universal screen 36 to cause any material placed therein to fall through the universal screen into the mixing vat 14 to strain any lumps or large particles therefrom.

Figures 3, 4:
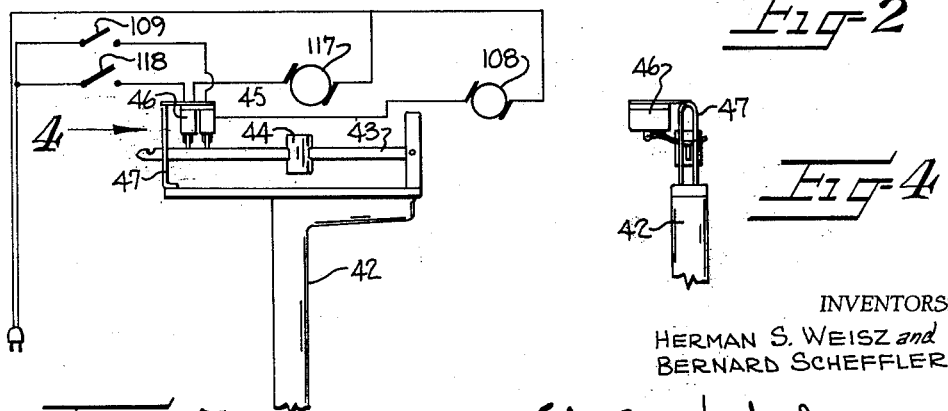
FIGURE 3 is an enlarged detail of the portable scale with portions broken away and with a wiring diagram shown schematically.
FIGURE 4 is a side elevation of the portion of the scale shown in FIGURE 3 with a portion thereof broken away.

A metering device indicated generally at 40 is provided adjacent vat 14 for measuring predetermined quantities of resins to be added to the mixing vat 14. Metering device 40 comprises a tank 41 adapted to receive the resins therein from vats 15 and 17 in a manner to be presently described and a portable scale 42 supporting tank 41 thereon. Portable scale 42 is of conventional type having a bar 43 (FIGURE 3) with a weight 44 slidably mounted thereon. Weight 44 may be selectively placed at predetermined points along bar 43 allowing predetermined quantities of resins to be placed in tank 41 before bar 43 rises upwardly. Bar 43 is connected to the platform of scale 42 on which tank 41 is supported in a conventional manner (not shown) to cause bar 43 to be pivoted upwardly as seen in FIGURE 3 when a predetermined weight is placed on the platform. A pair of normally closed switches 45, 46 are mounted on a bracket 47 which in turn is mounted on scale 42. Switches 45, 46 are so positioned above bar 43 that they will be opened thereby when bar 43 moves upwardly when a predetermined weight is placed on the platform of scale 42. Switches 45, 46 control the flow of resins to tank 41 in a manner to be presently described. Tank 41 communicates with mixing vat 14 by a suitable pipe 48 having a valve 49 therein for the transfer of the metered quantities of resins thereto.

A liquid inlet pipe 50 for placing suitable quantities of liquid such as water and the like in the vats 13 through 17 communicates with a suitable source (not shown) and a meter 51. Meter 51 communicates with vat 13 through a pipe 52 which has a suitable valve 53 therein for controlling the flow of liquid therethrough. A hose 54 is connected to pipe 52 by a suitable valve mechanism 55 and is usable for supplying liquid to clean the vat 13. Meter 51 communicates with vat 14 through a suitable pipe 56 connected to pipe 52. Pipe 56 has a suitable valve 57 therein for controlling the flow of liquid therethrough. A pipe 58 is connected to pipe 56 and communicates with vat 15 through a suitable valve 59. A pipe 60 is connected to pipe 58 and communicates with vat 16 through a suitable valve 61. A pipe 62 is connected to pipe 58 and communicates with vat 17 to another suitable valve 63. Through this system of pipes, the liquid inlet pipe 50 delivers predetermined quantities of liquid which are automatically measured by the meter 51 to the plurality of vats 13 through 17 as desired.

A solvent inlet pipe 64 communicates with a suitable source (not shown) and the inlet side of a meter 65 which communicates with vat 14 through a suitable pipe 66 which has a valve 67 connected therein for controlling the flow of solvent therethrough. Solvent inlet pipe 64 is adapted to supply to vat 14 a solvent of any desired type in predetermined quantities automatically measured by the meter 65. A second solvent inlet pipe 68 communicates with a suitable source (not shown) and a meter 69 which communicates with vat 14 through a pipe 70 having a suitable valve 71 therein. A pipe 72 is connected at one end to pipe 70 and communicates at the other end with vat 16 through a suitable valve 73. Pipe 68 is adapted to deliver to vats 14 and 16 predetermined quantities of a solvent of a different type than that delivered by pipe 64 which is automatically measured by the meter 69. A third solvent inlet pipe 74 communicates with a suitable source (not shown) and the inlet side of a meter 75 which communicates with vat 15 through a suitable pipe 76 having a valve 77 therein for controlling the flow of solvent therethrough. Solvent inlet pipe 74 is adapted to supply to vat 15 predetermined quantities, automatically measured by meter 75, of a solvent of still another different type than that delivered by pipes 64 and 68.

A fourth solvent inlet pipe 80 communicates with a suitable source (not shown) and the inlet side of a meter 81 which communicates with vat 15 through a pipe 82 having a valve 83 therein. A pipe 84 is connected at one end to pipe 82 and communicates at the other end through a suitable valve 85 with the vat 14. Solvent inlet pipe 80 is adapted to supply to vats 14 and 15 predetermined quantities, automatically measured by meter 81, of a solvent of a type different from those delivered by pipes 64, 68 and 74. Pipes 70 and 82 have connected thereto suitable flexible tubes or hoses 86, 87 having manually operable nozzles 88, 89 fixed to the free end thereof for drawing off amounts of the solvents supplied thereto as desired for cleaning of the vats.

A pipe 90 communicates at one end with the bottom of vat 13 and at the other end with the inlet side of a pump 91 through a valve 92. Pump 91 is driven by a suitable motor 91a operatively connected thereto. The outlet side of pump 91 communicates with vat 14 through a pipe 93 having a valve 94 therein. The end of pipe 93 which communicates with the vat 14 is adapted to terminate above vat 14 so that the universal screen 36 of strainer 35 may be placed thereunder to receive the material transferred from vat 13 therein. Vat 13 has a drain pipe 95 connected to the bottom thereof having an opening 96 therein for draining the contents of vat 13 as desired for cleaning of the vat. Pipe 95 has a valve 97 connected therein having a valve actuating rod 100 extending outwardly therefrom to a point outwardly of one of the sides of platform 11 where the same terminates in a suitable operating handle 101. Pipe 95 also communicates with the bottom of tank 14 and serves to drain the contents therefrom as desired. A second valve 102 is mounted in pipe 95 between the drain opening 96 and the bottom of vat 14 and has an operating rod 103 extending outwardly therefrom to a point outwardly of one of the sides of platform 11 where it terminates in an operating handle 104.

A pipe 105 is connected at one end to the bottom of vat 15 and at the other end to the inlet side of a pump 106 through a suitable valve 107. The outlet side of pump 106 communicates with the tank 41 of the metering device 40 through a suitable pipe 110 having a valve 111 therein. Pump 106 is driven by a suitable motor 108 and serves to transfer the contents of vat 15 into tank 41. Switch 45 (FIGURE 3) is connected in the circuit of motor 108 and serves to stop operation thereof when opened by bar 43 in response to the receipt of a predetermined quantity of the contents of vat 15 in tank 41. Motor 108 has a manually operable switch 109 connected in the circuit thereof for staring operation of motor 108 when it is desired to transfer the contents of vat 15 into tank 41. It is noted that switch 109 must be manually opened after switch 45 stops motor 108 or motor 108 will resume operation when bar 43 moves out of contact with switch 45.

A pipe 112 is connected at one end to the bottom of vat 17 and at the other end to the inlet side of a pump 113 and communicates therewith through a valve 114. The outlet side of pump 113 communicates with tank 41 of metering device 40 through a pipe 115 having a valve 116 therein. Pump 113 is driven by a suitable motor 117 and serves to transfer the contents of vat 15 into tank 41. Switch 46 (FIGURE 3) is connected in the circuit of motor 117 and serves to stop motor 117 when a predetermined quantity of the contents of vat 17 are transferred to tank 41 in the same manner as switch 45 stops operation of motor 108. Motor 117 has a manually operable switch 118 connected in the circuit thereof for starting operation of the same when it is desired to transfer some of the contents of vat 17 into tank 41. Like switch 109, switch 118 must be manually opened after switch 46 has stopped operation of motor 117. Although switches 109 and 118 are shown manually operable to open position, it is contemplated that suitable holding circuits could be used to automatically open these switches when switches 45, 46 are opened.

A pipe 119 is also connected to the bottom of tank 17 and has the end thereof open to serve as a drain to remove the contents from tank 17 as desired. A suitable valve 120 is connected in pipe 119 and has an operating rod 121 extending outwardly therefrom to a point outwardly of one of the sides of the platform 11 where it terminates in an operating handle 122. A pipe 123 is connected at either end to vats 15 and 16, respectively, and has an opening 124 therein to serve as a drain to remove the contents of vats 15 and 16 as desired. A valve 125 is mounted in pipe 123 between the drain opening 124 and vat 15 and has an operating rod 126 extending outwardly thereof to a point outwardly of one of the sides of the platform 11 where it terminates in an operating handle 127. A second valve 130 is mounted in pipe 123 between the drain opening 124 and vat 16 and has an operating rod 131 extending outwardly therefrom to a point outwardly of one of the sides of the platform 11 where it terminates in an operating handle 132.

A pipe 133 also is connected to the bottom of vat 16 at one end and at its other end to the inlet side of a suitable pump 134 driven by a motor 135. A suitable valve 136 is mounted in pipe 133 between pump 134 and vat 16 for controlling the flow of material therethrough. The outlet side of pump 134 communicates with a plurality of nozzles 137 through a pipe 138. Pipe 138 has a valve 139 mounted therein between pump 134 and nozzles 137 to control the flow of material therethrough. Each of the nozzles 137 has a valve 140 therein for selectively allowing the contents of vat 16 to be transferred to a plurality of storage tanks 141.

An ultrasonic disperser 142 is mounted adjacent vats 14 and 20. A pipe 143 is connected at one end to the bottom of vat 14 and at the other end to the inlet side of ultrasonic disperser 142. A valve 144 is mounted in pipe 143 between vat 14 and ultrasonic disperser 142 for controlling the flow of material from vat 14 to ultrasonic disperser 142. A pipe 145 is connected at one end to the bottom of vat 20 and at the other end to pipe 143 between valve 144 and ultrasonic disperser 142. A valve 146 is mounted in pipe 145 between vat 20 and pipe 143 for controlling the flow of material from vat 20 to ultrasonic disperser 142.

A pipe 147 is connected at one end to the outlet side of ultrasonic disperser 142 for directing material therefrom to a predetermined point. A pair of spaced valves 148, 149 are mounted in pipe 147 for controlling the flow of material therethrough. The other end of pipe 147 has a flexible hose 150 mounted thereon for selectively transmitting material from pipe 147 into a plurality of storage tanks 151. Tanks 151 are supported by a suitable scale 151a which weighs the emulsion being placed in the tanks 151 and serves to indicate when each tank is filled with the emulsion. A switch 142a is mounted on platform 11 adjacent tanks 151 and is connected in the circuit of ultrasonic disperser 142. Switch 142a is so positioned that the operator may see the scale 151a so that he may know when one of the tanks 151 is full and can stop the ultrasonic disperser 142 by opening switch 142a. When switch 142a is opened, hose 150 may be transferred to another tank and the switch 142a closed to again start the ultransonic disperser 142. This continues until all of the tanks 151 are filled or until all of the emulsion is discharged.

A pipe 152 is connected at one end to pipe 147 between the valve 148 and the ultrasonic disperser 142 and terminates at the other end in a nozzle 153 above vat 14 for transferring material from the outlet side of ultrasonic disperser 142 into vat 14. A valve 154 is mounted in pipe 152 between pipe 147 and nozzle 153 for controlling the flow of material therethrough. A valve 155 is mounted in nozzle 153 for controlling the flow of material into vat 14.

A pipe 156 is connected at one end to pipe 147 between the spaced valves 148, 149 and communicates at its other end with vat 20 for transferring material from the outlet side of ultrasonic disperser 142 into vat 20. A valve 157 is mounted in pipe 156 intermediate its ends for controlling the flow of material therethrough. A pipe 158 is connected at one end to pipe 147 between the spaced valves 148, 149 and communicates at its other end with a storage tank 159. A valve 160 is mounted in pipe 158 adjacent the end connected to pipe 147 for opening or closing pipe 158 for controlling the flow of material therethrough. A valve 161 is mounted in pipe 158 adjacent the end communicating with tanks 159 for controlling the flow of material therethrough at that end of the pipe. Pipe 158 is adapted to direct used cleaning solvent which has been passed through vats 14 or 20 and ultrasonic disperser 142 into storage tank 159 where the same is stored for re-use.

A pipe 163 is connected at one end to a stand pipe 164 mounted in tank 159 and at the other end to the inlet side of a pump 165. Stand pipe 164 extends upwardly from the bottom of tank 159 a sufficient distance to insure that no sediment will be drawn into the open end thereof. Pump 165 is driven by a suitable motor 166 operatively connected thereto. A pipe 167 is connected at one end to the outlet side of pump 165 and communicates at its other end with vat 14 for transferring old cleaning solvent from pump 165 into vat 14 for cleaning thereof. A valve 168 is mounted in pipe 167 adjacent vat 14 for controlling the flow of old solvent therethrough into vat 14. A pipe 170 is connected at one end to pipe 167 between pump 165 and valve 168 and communicates at its other end with vat 20 for transferring old cleaning solvent from pump 165 into vat 20 for cleaning thereof. A valve 171 is mounted in pipe 170 for controlling the flow of old solvent therethrough into vat 20.

A pipe 172 is connected at one end to the bottom of vat 20 and terminates at its other end in an opening which serves to drain the contents of vat 20 as desired. A valve 173 is mounted in pipe 172 between vat 20 and the drain opening for controlling the flow of material therethrough. Valve 173 has an operating rod 174 extending outwardly therefrom to a point outwardly of one side of platform 11 where it terminates in an operating handle 175.

A control panel 176 is mounted on platform 11 closely adjacent the vats. Panel 176 includes switches 109 and 118 for starting operation of pump motors 108 and 117, respectively, as well as switches for controlling operation of the other pump motors 91a, 135 and 166. Panel 176 also includes switches for starting and stopping operation of mixing device drive motor 34 and straining device motor 37.

A control device 177 is mounted on platform 11 adjacent the vats for controlling operation of the hydraulic lift motor 28 which raises and lowers mixing device 24.

In operation, if a printing dye of any color other than white is desired to be manufactured, the cakes of color pigments are placed in vat 13 and a dispersion liquid such as water or the like is added to vat 13 in predetermined quantities as controlled by a previous setting of meter 51 and the opening of valve 53. The mixing device 24 is then moved into position over vat 13 and the mixing rotor 32 is lowered thereinto by the hydraulic lift mechanism. Mixing rotor 32 is rotated by motor 34 through shaft 33 to dissolve or disperse the cakes of color pigment in the dispersion liquid to the desired consistency to provide a dispersion of the color pigments in the liquid with a generally smooth consistency. The dispersed color pigments and liquid are transferred from vat 13 through pipes 90 and 93 by the pump 91 into the universal screen 36 of the straining device 35. Motor 37 of the straining device shakes the universal screen 36 to strain the coloring material therethrough to remove any granular lumps or pieces of the color pigment cakes which have not been dissolved or reduced to finely divided particles and dispersed in the liquid. The strained color pigments and liquid fall from the screen 36 into the vat 14. Predetermined quantities of solvents and liquid are added to the vat 14 as desired in quantities controlled by the previous setting of meters 51, 65, 69, 75 and 81 by opening of the respective valves 57, 67, 71 and 85.

The resins which are to be added to vat 14 are reviewed at the plant and placed in vats 15 and 17 which will accommodate two types of resins. Two types of solvents may be added to the resin in vat 15 through pipes 74, 76 and 82. Also, a liquid such as water or the like may be added if desired through pipes 52, 56 and 58. The resin, solvents and liquid are premixed in vat 15 by mixing device 24 which is movable into vat 15 and serves to thoroughly mix the contents thereof.

Liquid may be added to the resin in vat 17 through pipes 52, 56, 58 and 62 if desired. The resin and liquid are manually premixed in vat 17. The resins are stored in vats 15 and 17 until the same are to be used in the manufacture of a dye.

When a dye composition calls for the addition of either the resin in vat 15 or the resin in vat 17 or both, the weight 44 is moved along bar 43 of the scale 42 to set the scale to measure the quantity of resin in vat 15 to be added to vat 14. Valves 107 and 111 are opened and switch 109 on the control panel 176 is closed starting motor 108 which drives pump 106 to pump the resin from vat 15 into tank 41. When the quantity of resin in tank 41 reaches the amount previously set, bar 43 will rise opening switch 45 and stopping motor 108. Switch 109 is then manually opened and valves 107 and 111 are closed. Valve 49 is opened and the resin in tank 41 flows through pipe 48 into vat 14.

The procedure for the addition of resin from vat 17 is substantially the same as for the addition of resin from vat 15. Valves 114 and 116 are opened and switch 118 is closed starting motor 117 which drives pump 113. Pump 113 pumps the resin from vat 17 into tank 41 until a predetermined quantity, as determined by the previous setting of scale 42, is received in tank 41. Bar 43 opens switch 46 which stops the operation of motor 117. Switch 118 is then manually opened and valves 114 and 116 are closed. Valve 49 is again opened and the resin from vat 17 flows into vat 14.

When the desired liquid, solvents and resins have been added to vat 14, mixer 24 is transferred from the vat 13 to vat 14 and the rotor 32 is lowered into vat 14. Mixing rotor 32 is rotated in vat 14 by motor 34 through shaft 33 at a predetermined speed for the desirable length of time to disperse the color pigments in the other materials and to form as thorough a mixture or dispersion thereof as is possible. After the color pigments are mixed in tank 14 with the other materials to form a dispersion thereof, the same is transferred to the ultrasonic disperser 142 by pipe 143.

The dispersion of coloring material is acted upon by the ultrasonic disperser 142 to form an emulsion, or to more finely divide the particles of each of the materials in the dispersion, which has a relatively longer life than does the dispersion which is fed into the ultrasonic disperser 142. The emulsion of coloring material is then transferred from the ultrasonic disperser 142 to suitable storage receptacles 151 by the pipe 147 and flexible tube 150.

If desired, the emulsion of coloring material may be transferred from the ultrasonic disperser 142 back into vat 14 by way of the pipe 152 and nozzle 153 which can be opened by opening of the valves 154 and 155. It will, therefore, be seen that the emulsion of coloring material can be remixed in the vat 14 and then transferred again to the ultrasonic disperser 142 for increasing the fineness of the undivided particles in the emulsion of coloring material to still further increase the life of suspension thereof. Also, if desired, the emulsion may be transferred from the ultrasonic disperser 142 into vat 20 by pipes 147 and 156. The emulsion may be stored in vat 20 until it is desired to transfer the same to the ultrasonic disperser 142 for further action thereby. It will, therefore, be seen that two separate routes of reprocessing of the emulsion after action thereon by the ultrasonic disperser 142 are provided. The first of these being remixing thereof in the mixing vat 14 and a second action by the ultrasonic disperser 142 and the second being a storing in vat 20 and a second action by the ultrasonic disperser 142.

When it is desired to mix a dye of white color, the mixing vat 16 is used. This vat is reserved for the mixing of white dye and is used only for this purpose inasmuch as the addition of any other color thereto would be readily seen in the finished product. The color pigments are added to the vat 16 and a suitable dispersion liquid and a solvent are added, as desired, in quantities as determined by meters 51 and 69.

Mixing device 24 is moved into position over vat 16 and rotor 32 is lowered thereinto by the withdrawal of hydraulic fluid from column 26 by pump 27. Rotor 32 is rotated by motor 34 through shaft 33 to thoroughly mix the contents of vat 16 to form a dispersion of the color pigments in the dispersion liquid and/or solvent. Once the color pigments are thoroughly dispersed within the dispersant liquid and/or solvent, the same is withdrawn from the vat 16 through pipes 133 and 138 by pump 134 and transferred into suitable receptacles 141 by means of the nozzles 137.

After a suitable batch of dyes have been mixed in the vats, the vats must be cleaned. To effect this cleaning, solvents or water are added to the vats by the hoses 54, 86 and 87 and the vats thoroughly scrubbed. Once the vats have been cleaned, any liquid which has been used is drained therefrom through the respective drain pipes.

If a solvent is used to clean any of the vats, except for vats 14 and 20, it too is drained from the vats through the respective drain pipes. Due to the expensive nature of the solvents, it is desirable to retain as much as possible of the solvent used for cleaning for reuse. The cleaning solvent used to clean vats 14 and 20 is also passed through the ultrasonic disperser 142 to clean the same. After drawing the same through the ultrasonic disperser, the solvent is transferred through pipes 147 and 158 into the storage tank 159, wherein the solvent is stored and the material cleaned from vats 14 and 20 is allowed to settle to the bottom. If desired, the used solvent may be used again and again for cleaning of vats 14 and 20 by drawing the old solvent from which the material has settled off through stand pipe 164 and pipes 163, 167 and 170, as desired, by means of pump 165 into the vats 14 and 20.

It will be apparent that an improved apparatus for manufacturing emulsions of coloring materials is provided whereby the number of steps for the manufacture of such an emulsion and the amount of apparatus necessary for this manufacture has been materially reduced. Also, the apparatus of the present invention provides an emulsion of coloring material capable of staying in suspension for a substantially longer time than has heretofore been possible. Still further, the apparatus of the present invention materially reduces the number of employees required for the manufacture of the emulsion of coloring material while increasing the quality of the emulsion and increasing the production thereof with a consequent decrease in cost.

In the drawings and specification there has been set forth several embodiments of the invention, and although specific terms are employed, they are used in a generic and descriptive sense only and not for purposes of limitation, the scope of the invention being defined in the claims.

We claim:

1. Apparatus for manufacturing emulsions of coloring material comprising at least two vats positioned adjacent each other, common mixing means positioned adjacent said vats for mixing the contents thereof, a first of said vats being adapted to receive color pigments therein, means communicating with said first vat for placing therein as desired metered quantities of a suitable liquid, said mixing means serving to mix the color pigments and liquid in the first vat to disperse the color pigments in the liquid to form a mixture of generally smooth consistency, means connecting the first vat to the second of said vats for transferring the mixture from the first vat to the second vat, means for straining the mixture prior to its placement into the second vat to remove any lumps and the like therefrom, means communicating with said second vat for placing therein metered quantities of liquid, solvents and resins as desired, said mixing means being movable from said first vat into said second vat and serving to mix the mixture of the color pigments and the liquid and the added liquid, solvents and resins therein to provide a further dispersion of the color pigments in the liquid, an ultrasonic disperser communicating with said second vat for the receipt of the dispersion therefrom, said disperser serving to form an emulsion of the color pigments and liquid, and means communicating with the disperser for directing the emulsion discharged therefrom to a desired point.

2. Apparatus for manufacturing emulsions of coloring material comprising at least two vats positioned adjacent each other, a power operated mixing device positioned adjacent said vats and selectively movable from one vat to the other to mix the contents thereof, one of said vats being adapted to receive color pigments therein, means communicating with said first vat for placing therein a metered quantity of a liquid as desired, said mixing device being movable into said first vat for mixing the color pigments and liquid to form a mixture of generally smooth consistency, means connecting said first vat to the second of said vats for transferring the mixture from the first vat into the second vat, means for straining the mixture prior to its placement into the second vat, means communicating with said second vat for transferring thereto as desired metered quantities of suitable solvents, means communicating with said second vat for transferring thereto as desired metered quantities of suitable resins, said mixing device being movable from said first vat into said second vat for mixing the color pigments and other materials therein to provide a dispersion of the color pigments and the other material, an ultrasonic disperser communicating with said second vat for the receipt of the dispersion therefrom, said disperser serving to form an emulsion of the color pigments in the other material, and means communicating with the disperser for directing the emulsion discharged therefrom to a desired point.

3. Apparatus for manufacturing emulsions of coloring material comprising a plurality of vats positioned adjacent each other, a power operated mixing device positioned adjacent said vats and selectively movable from one vat to the other vats to mix the contents thereof, a first of said plurality of vats being adapted to receive color pigments therein, means communicating with said first vat for placing therein as desired metered quantities of a dispersant liquid from a suitable source, said mixing device being movable into said first vat for mixing the color pigments and liquid to disperse the color pigments in the liquid to form a mixture of generally smooth consistency, means connecting said first vat to a second of said vats for transferring the mixture from the first vat into said second vat, means communicating with said second vat for transferring thereto as desired metered quantities of suitable solvents, a third vat of said plurality of vats being adapted to receive a suitable resin therein, means communicating with said third vat for placing therein as desired metered quantities of a liquid and suitable solvents for forming a solution or dispersion of the resin, means connecting said third vat to said second vat for transferring as desired the resin solution or dispersion from the third vat to the second vat in predetermined quantities, said mixing device being movable from said first vat into said second vat for mixing the mixture of color pigments and liquid and the solvents and resins to provide a dispersion of the color pigments and the other material, an ultrasonic disperser communicating with the second vat for the receipt of the dispersion therefrom, said disperser serving to form an emulsion of the color pigments and other material capable of remaining in suspension for a relatively long length of time, and means communicating with the disperser for directing the emulsion discharged therefrom to a desired point.

4. Apparatus for manufacturing emulsions of coloring material comprising a plurality of vats positioned adjacent each other, a power operated mixing device positioned adjacent said vats and selectively movable from one vat to the other vats to mix the contents thereof, a first of said plurality of vats being adapted to receive color pigments in cake form therein, means communicating with said first vat for placing therein as desired metered quantities of a dispersant liquid from a suitable source, said mixing device being movable into said first vat, said mixing device serving to break up the cakes of color pigments into small particles and to disperse the same in the liquid to a mixture of generally smooth consistency, means connecting said first vat to a second of said vats for transferring the mixture from the first vat into said second vat, means for straining the mixture prior to its placement into the second vat, means communicating with said second vat for transferring thereto as desired metered quantities of suitable solvents, a third of said vats being adapted to receive a suitable resin therein, means communicating with said third vat for placing therein as desired metered quantities of a liquid and suitable solvents, said mixing device being movable into said third vat for mixing the resin, liquid and solvents to form a resin solution or dispersion, means connecting said third vat to said second vat for transferring as desired the resin solution or dispersion from the third vat to the second vat, metering means positioned between said second and third vats for metering the quantity of resin solution transferred from said third vat to said second vat, said mixing device being movable into said second vat for mixing the mixture of color pigments and liquid and the solvents and resins to provide a dispersion of the color pigments and the other material, an ultrasonic disperser communicating with the second vat for the receipt of the dispersion therefrom, said disperser serving to form an emulsion of the color pigments and other material capable of remaining in suspension for a relatively long length of time, and means communicating with the disperser for directing the emulsion discharged therefrom to a desired point.

5. The structure set forth in claim 4, including a fourth vat of said plurality of vats being adapted to receive another suitable resin therein, means communicating with said fourth vat for placing therein as desired metered quantities of the liquid to form a second resin solution or dispersion, and means connecting said fourth vat and said second vat for transferring as desired the resin solution or dispersion from said fourth vat into said second vat, said metering means being also positioned between said second and fourth vats for metering the quantity of resin solution or dispersion transferred from said fourth vat into said second vat.

6. The structure set forth in claim 4, wherein said straining means comprises a universal screen adapted to receive the mixture from said first vat therein and vibrating motor means operatively connected to said universal screen to shake said screen to cause any material therein to fall through said screen and be strained thereby.

7. The structure set forth in claim 4, wherein said mixing device comprises a motor, a shaft rotatively mounted adjacent said motor and operatively connected thereto, and a rotor mounted on said rotatively mounted shaft for rotation therewith and having a serrated peripheral edge.

References Cited in the file of this patent
UNITED STATES PATENTS

| | | |
|---|---|---|
| 1,490,705 | Lauterbur | Apr. 15, 1924 |
| 2,343,454 | Harnett | Mar. 7, 1944 |
| 2,385,737 | Smith | Sept. 25, 1945 |
| 2,558,037 | Calhoun | June 26, 1951 |
| 2,578,505 | Carlin | Dec. 11, 1951 |
| 2,581,414 | Hochberg | Jan. 8, 1952 |
| 2,651,582 | Courtney | Sept. 8, 1953 |
| 2,900,176 | Krogel | Aug. 18, 1959 |